United States Patent [19]

Rogers

[11] 4,314,198
[45] Feb. 2, 1982

[54] SOLAR POWER SOURCE FOR A LIGHTING SYSTEM

[75] Inventor: William E. Rogers, San Antonio, Tex.

[73] Assignee: Solar Physics, Inc., San Antonio, Tex.

[21] Appl. No.: 80,405

[22] Filed: Oct. 1, 1979

[51] Int. Cl.³ .......................... G05F 3/08; H02J 7/32
[52] U.S. Cl. .......................... 323/351; 250/214 AL; 315/200 A; 315/311; 315/360; 320/5; 323/231; 323/283; 323/906
[58] Field of Search .......... 315/200 A, 208, 209 R, 315/292, 307, 311, 316, 323, 360; 320/2, 5; 323/17, 276, 282, 283, 285, 351, 906; 250/214 AL

[56] References Cited

U.S. PATENT DOCUMENTS

| | | | |
|---|---|---|---|
| 2,780,765 | 2/1957 | Chapin et al. | 320/2 |
| 3,130,349 | 4/1964 | Mallory | 315/200 A |
| 3,253,186 | 5/1966 | Rogers et al. | 315/200 A |
| 3,824,129 | 7/1974 | Fagan | 320/2 UX |
| 4,030,024 | 6/1977 | Chambers et al. | 323/17 |
| 4,090,107 | 5/1978 | Seib | 315/208 X |
| 4,137,557 | 1/1979 | Ciarniello et al. | 361/92 |
| 4,149,113 | 4/1979 | Sammis | 315/200 A |
| 4,198,563 | 4/1980 | Elssner | 315/360 X |
| 4,209,728 | 6/1980 | Membreno | 315/360 |
| 4,230,970 | 10/1980 | Potter et al. | 315/311 |

Primary Examiner—A. D. Pellinen
Attorney, Agent, or Firm—Gale R. Peterson

[57] ABSTRACT

A solar recharged power supply circuit for a lighting system which circuit includes a rechargeable power source, a solar powered recharger connected to that rechargeable power source and which circuit prevents discharge of that rechargeable power source through the solar powered recharger during times when the recharger is inactive; prevents overcharging of that power source; prevents discharging that power source below a predetermined level; and automatically connects and disconnects the lighting system to and from the rechargeable power source.

5 Claims, 4 Drawing Figures

SOLAR POWER SOURCE FOR A LIGHTING SYSTEM

BACKGROUND OF THE INVENTION

The solar power source of the present invention is particularly suitable for powering outdoor advertising signs of the type and in a manner described in pending U.S. Application No. 90,322, filed Nov. 1, 1979, for Solar Powered Lighting System, by Edward J. Stackpole. Generally, however, the solar power source of the present invention would have application in any environment where a constant power source were desired. Because the present primary application of the herein described invention is for powering outdoor advertising signs, however, the invention will be described in conjunction therewith for explanatory purposes only.

Illuminated outdoor advertising signs have traditionally been powered by connection to the local electrical utility service. That involves, of course, hiring an electrician to make the appropriate electrical connections to such signs and also involves the recurring monthly charge for electricity used. It is desirable for both environmental and economic reasons to use an alternative to commercially produced electricity. Solar power offers such alternative.

Previous attempts at solar powered signs, however, have involved taking the low voltage output of photovoltaic panels and converting that low voltage to a higher voltage in order to power conventional illumination sources. As described more fully in the above referenced application, such attempts have generally failed because the voltage conversion involves energy loss and concomittant inefficiency. The above referenced application solves that problem by using a sign capable of being operated at low voltage. For example, a sign illuminated with light emitting diodes requires the same low voltage generated by conventional photovoltaic panels. That type of system is inherently more efficient because voltage conversion is not required.

The present invention consists of a solar power source designed to operate such a low voltage sign. Because the solar power source is entirely self-contained, no connection to a local electrical utility service is necessary and of couse no commercially produced electricity need be used.

Lastly, the electronic control of the present invention is capable of sensing a drop in battery voltage and operates to turn the powered device off until the battery is recharged thereby avoiding excessive battery discharge.

SUMMARY OF THE INVENTION

The solar power supply of the present invention is a combination of a photovoltaic battery charger, a battery and an electronic control to operate a low voltage device, for example a low voltage illuminated sign.

The battery charger consists of a photovoltaic panel capable of producing electricity from sunlight. A blocking device in series with that panel prevents the battery from discharging through the photovoltaic panel during periods when that panel is not producing electricity, e.g. on cloudy days or at night. Provision is also made to prevent battery overcharging.

In the case of advertising signs, a control is necessary to turn the sign on and off at appropriate times. That is the function of the electronic control of the present invention. That control, of course, may be used to turn whatever device or load is being powered by the present invention on and off. The control for turning the powered device or load on may consist of either an electronic clock set to the desired "on time" or a photoresistor operable to turn the device on and off when ambient light reaches predetermined levels. In the case of an illuminated outdoor sign, the clock may be set to the prevailing sundown time or the photoresistor may operate to turn the sign on at dusk.

The electronic control also operates to turn the sign off at an appropriate time through use of a timer actuated when the device is turned on. Once the timing period has expired, the device is turned off. The timing period, of course, is set for the desired length of operation.

The control of the present invention also includes an additional timer circuit for, in the case of powering a sign, flashing operation. Such flashing attracts attention to the sign and also conserves energy by leaving the sign on for only a fraction of the total operating time. If the sign were to be left on continuously, a larger power supply would be needed for the same duration of operation.

Therefore, the primary object of the invention is to provide a solar power source for powering low voltage devices.

Another object of the invention is to provide a device for charging a battery by using solar power.

A further object of the invention is to provide a control circuit for intermittantly operating a low voltage device.

Another object of the invention is to provide a control circuit for automatically turning a low voltage device on and off.

A further object is to provide a solar power source for an illuminated outdoor sign.

Other objects, features, and advantages of the invention will become evident in light of the following detailed description, in conjunction with the referenced drawings, of a preferred exemplary system according to the invention.

DETAILED DESCRIPTION OF THE DRAWINGS

DETAILED DESCRIPTION OF THE INVENTION

The power supply of the present invention utilizes a rechargeable D.C. power supply 10, for example a conventional 12-volt automobile lead-acid cell battery to directly power a low voltage load device 11, for example a sign illuminated by banks of 6 1.5-volt to 2-volt light emitting diodes connected in series. In the case of illuminated signs and similar loads, it would be impractical to constantly replace power supply 10 once discharged. Therefore, for practical reasons, power supply 10 is rechargeable.

Figure 1:
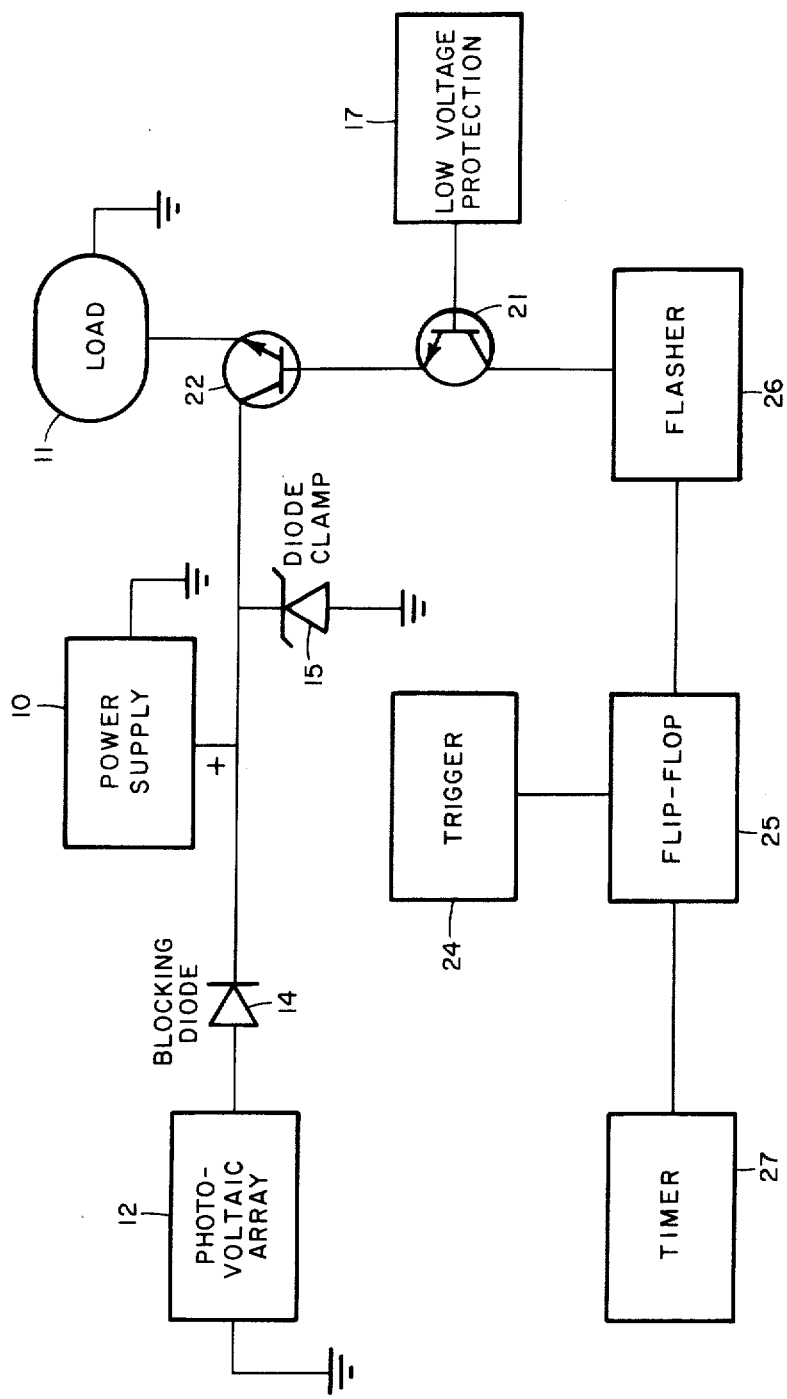
FIG. 1 is a block diagram of the power supply of the present invention.
Figure 2:
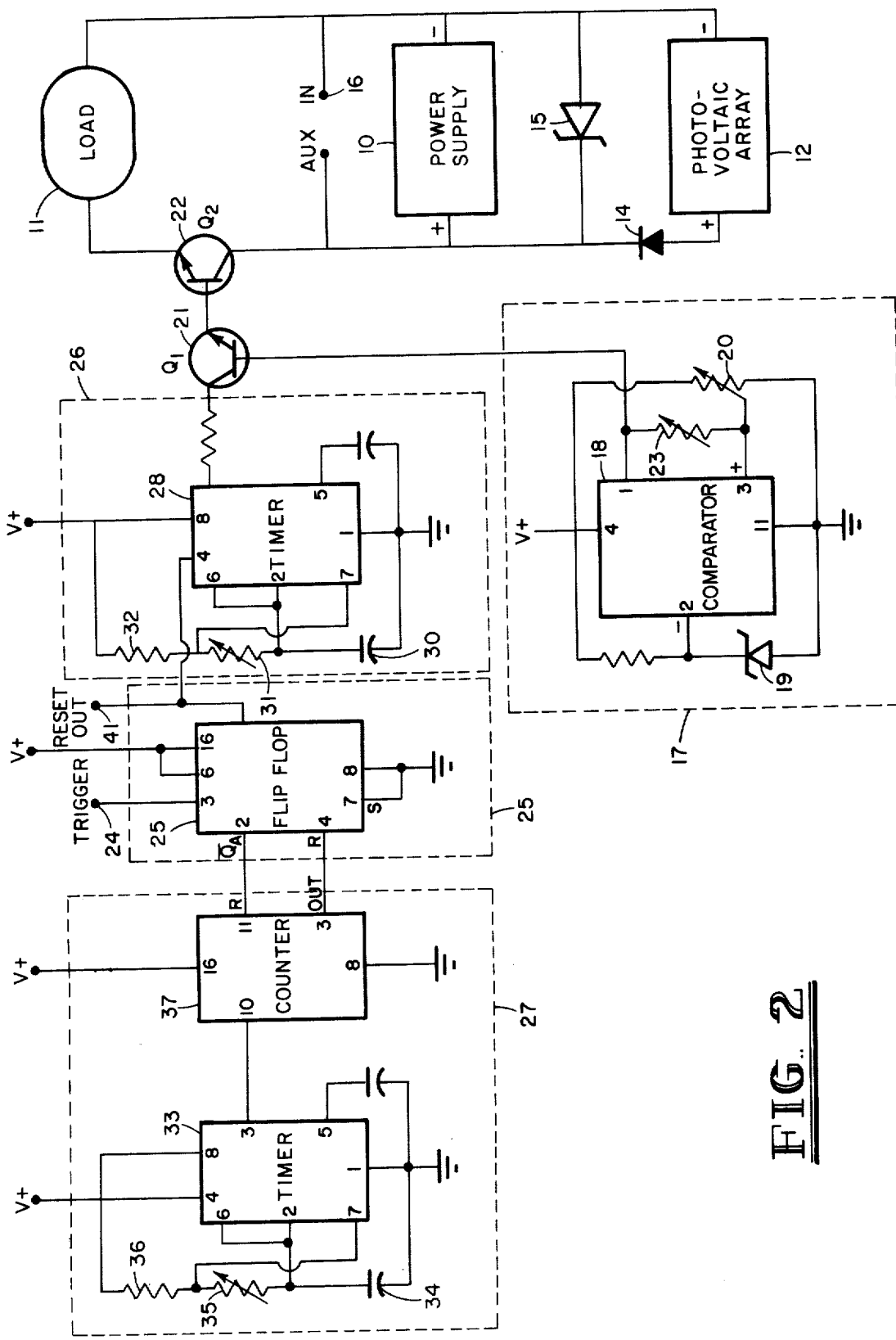
FIG. 2 is a detailed schematic of the power supply of the present invention.

The power supply of the present invention uses a photovoltaic array 12 of conventional design for recharging D.C. power supply 10. For example, if D.C. power supply 10 consists of a conventional automobile lead-acid cell 12-volt battery, photovoltaic array 12 should consist of a sufficient number of photovoltaic cells to generate approximately 12-volts. Such photovoltaic array 12 may be directly connected to rechargeable D.C. power supply 10. Under no sun conditions, however, power supply 10 would discharge through photovoltaic array 12. To prevent such discharge, a blocking diode 14 should be placed in circuit between photovoltaic array 12 and power supply 10 as shown in FIG. 1 and FIG. 2. At the opposite end of the spectrum, means to prevent power supply 10 from overcharging must also be provided. Any suitable circuit means capable of clamping power supply 10 at its full potential and operating as a discharge path for photovoltaic array 12 once power supply 10 becomes fully charged is suitable. Zener diodes provide such a function. Therefore, a zener diode 15 placed in circuit across power supply 10 as shown in FIG. 1 and FIG. 2 would operate to clamp power supply 10 at its full potential, but prevent overcharge by providing a discharge path for photovoltaic array 12 once the full potential of power supply 10 has been reached. As illustrated in FIG. 2, it is also preferable to provide suitable circuit connections 16 for a conventional battery charger in the event of unusually extended cloudy weather.

As is generally known, if rechargeable D.C. power supplies, e.g. lead-acid cell batteries, are allowed to discharge below a certain level, recharge is rendered difficult and occasionally impossible. Therefore, the solar power supply of the present invention provides a low voltage protection circuit means 17 for turning off the powered device or load 11 in the event the D.C. potential of power supply 10 drops below a predetermined value. That circuit means will maintain the power device or load 11 in an off condition until the potential of power supply 10 has been charged to a predetermined level.

Again, and for purposes of explanation only, if power supply 10 consists of a conventional automotive lead-acid cell battery and the load 11 consists of an outdoor illuminated sign, the circuit of the present invention will turn off the sign if the potential of power supply 10 drops below 10.5 volts and will maintain the sign in an off condition until power supply 10 has been charged up to 12 volts.

As shown in FIG. 2, low voltage protection circuit 17 consists of differential input comparator circuit means 18 having hysteresis. Any such comparator may be used, for example, an LM 324 operational amplifier. Comparator 18 operates to compare the voltage drop across a zener diode 19 with the potential of power supply 10. The voltage drop across zenor diode 19 is thus used as a reference voltage. A 10.5 threshold voltage and a 1.5 volt hysteresis loop voltage may be adjusted by variable resistors 20 and 23. Preferably, zener diode 19 is a 6-volt zener diode. Resistor 20 operating as a voltage divider may then be adjusted such that the input at signal position 3 of comparator 18 will be 6-volts when V+ is 10.5-volts. If voltage V+ drops below the threshold voltage, e.g. 10.5-volts, the output of comparator 18 also drops turning off transistor 21. Turning off transistor 21 opens the circuit to the base of transistor 22 thus preventing transistor 22 from conducting, i.e. closing the circuit between power supply 10 and load 11. As long as the output of comparator 18 is held low, transistor 22 will prevent power supply 10 from discharging through load 11. As is apparent, a requirement for comparator 18 is that it have hysteresis in order to maintain transistor 21 conducting until V+ drops below the threshold voltage. The output level of comparator 18 may, of course be adjusted by variable resistor 23. Therefore, if voltage V+ drops below 10.5 volts, transistor 21 will be turned off thus preventing preventing load 11, e.g. an advertising sign, from operating until power supply 10 has been charged to a predetermined level, e.g. 12-volts.

When power supply 10 is charged, reference voltage V+ will rise thus resetting comparator 18.

Low voltage protection circuit 17 only blocks discharge of power supply 10 through load 11. The hereinafter described control circuits use only small amounts of current and will continue to operate despite a low voltage condition.

Power to load 11 may be automatically supplied by virtue of trigger circuit 24 and bistable multivibrator or flip-flop circuit 25. When an input triggering signal from trigger circuit 24 is received, bistable multivibrator 25 causes transistor 22 to conduct thereby closing the circuit between power supply 10 and load 11. Although multivibrator 25 may be so connected, certain applications for the power supply of the present invention render intermittant load actuation, i.e. flashing as in the case of an illuminated sign, desirable. Therefore, as shown in FIG. 2 output $Q_A$ from circuit 25 is connected to a flasher circuit means 26.

Flasher circuit 26 consists of an astable multivibrator outputting a train of pulses to switch transistor 22 on and off repetitively. Accordingly, power from power supply 10 to load 11 will be intermittantly interrupted. In the case of an advertising sign, the sign will flash. As shown in FIG. 2, the astable multivibrator of flasher circuit 26 consists of a timer circuit, for example an LM 555 operational amplifier timer, having a reset connected to the output of bistable multivibrator 25. Capacitor 30 charges through resistors 31 and 32 and discharges through resistor 31. Because the duty cycle of the timer depends on the ratio of variable resistor 31 to resistor 32, the flash rate may be set by adjusting variable resistor 31. Flasher circuit 26 will continue to operate so long as signal $Q_A$ from bistable multivibrator 25 remains high.

The advantage of using such a flasher circuit for powering an advertising sign is that the sign need only be on for half the time of operation, thus reserving power stored in power supply 10.

After trigger 24 serves to automatically provide power to load 11 according to the foregoing, it is desirable to provide a timing means for opening the power circuit to load 11 (i.e. turning transistor 22 off) at the end of a desired period of operation. Therefore, the power supply of the present invention includes a timing circuit means 27. Such timer must be able to time periods of several hours and be adjustable to allow for varying the operating time period.

Timing circuit 27, as shown in FIG. 2, consists of an astable or free running multivibrator 33, for example an LM 555 timer connected in the manner shown. As in flasher circuit 26, capacitor 34 charges through variable resistor 35 and resistor 36 and discharges through variable resistor 35. The duty cycle is adjustable by varying variable resistor 35. Timing circuit 27 also includes a counter 37, for example a 4020 counter, which serves to count pulses generated by astable multivibrator 33 until a predetermined number of pulses is reached. At that point, counter 37 generates an output reset pulse to bistable multivibrator 25. Resetting multivibrator 25 turns off transistor 22 thus shutting off power to load 11. As shown in FIG. 2, timer 37 counts $2^{14}$ pulses before generating a reset signal to multivibrator 25. Because the pulse rate of multivibrator 33 is adjustable by varying resistor 35, the length of operation is determined by variable resistor 35. Multivibrator 25 starts the timing action of timing circuit 27 by outputting a signal $\overline{Q}_A$ upon being triggered by trigger 24. That signal serves to reset timing circuit 27.

Figure 3:
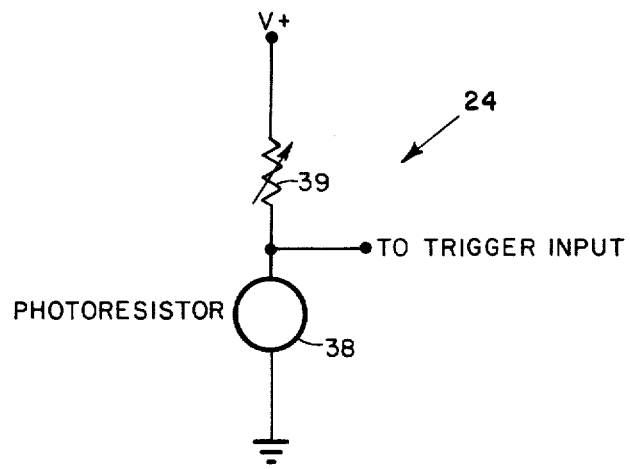
FIG. 3 is a schematic of the electronic control of the present invention using a photoresistor.

FIG. 3 illustrates a suitable trigger 24 for multivibrator 25. A suitable photo cell 38, for example a CdS photoresistor is used in a voltage divider circuit with variable resistor 39. Such triggering circuit would have particular application in the case of an outdoor advertising sign load for the power supply of the present invention. As the ambient light drops in the evening, the resistance of photoresistor 38 would increase until the voltage drop across photoresistor 38 is sufficient to trigger multivibrator 25. As the ambient light increases due to the sun rising in the morning, the resistance of photoresistor 38 decreases. Because multivibrator 25 must be triggered by a rising voltage as opposed to a falling voltage, trigger 24 can no longer serve to trigger multivibrator 25.

Figure 4:
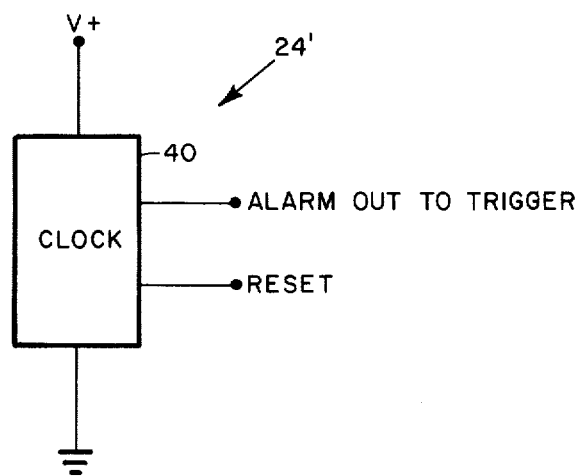
FIG. 4 is a schematic of the electronic control of the present invention using a digital clock.

FIG. 4 illustrates another possible trigger circuit 24'. A conventional digital alarm clock may be used to trigger multivibrator 25 by connecting the alarm output of such clock to multivibrator 25. At the set alarm time, the alarm output would serve to trigger multivibrator 25. As multivibrator 25 is triggered, signal $Q_A$ rises and may be used to automatically reset the clock alarm, as shown in FIG. 2 at 41.

Thus, the solar power supply of the present invention provides a unique efficient compact power supply for powering any number of low-voltage devices.

I claim:

1. A solar recharged power supply circuit for a lighting system comprising:
   a rechargeable power source operably connected to a lighting system operable at the same potential as said rechargeable power source;
   an array of photovoltaic cells operably connected to said rechargeable power source for supplying charging current to said rechargeable power source;
   diode means connected between said power source and said array of photovoltaic cells such that current flowing from said rechargeable power source to said array of photovoltaic cells is substantially blocked;
   zener diode means operably connected between said power source and ground such that said zener diode means clamps the potential of said power source at its full potential;
   means for disconnecting said power source from said lighting system if the potential of said power source drops below a predetermined value comprising means for comparing the potential of said power source with a reference voltage potential, and first transistor switch means connected to second transistor switch means operably connected between said power source and said lighting system wherein said first transistor switch means is responsive to a signal output from said comparing means and causes said second transistor switch means to disconnect said power source from said lighting system if said power source potential drops below a predetermined value represented by said reference voltage wherein said means for comparing includes a differential input operational amplifier with hysteresis having an output operably connected to said first transistor switch means, one input connected to said power source, the other input connected to said reference voltage potential, and a zener diode connected between said other input and ground for clamping said other input to a predetermined value;
   timer means for generating pulses through said first transistor switch means to said second transistor switch means causing said second transistor switch means to intermittingly connect and disconnect said lighting system from said power source;
   bi-stable signal generating means operably connected to said timer means wherein said timer means generates pulses to said second transistor switch means causing intermittent connect and disconnect between said lighting system and said power source in response to a signal from said bi-stable signal generating means;
   trigger means operably connected to said bi-stable signal generating means for causing said signal generating means to generate a signal to said timer means;
   second timer means for automatically disconnecting said lighting system from said power source after a predetermined time interval comprising counting means operably connected to said bi-stable signal generating means, pulse generating means operably connected to said counting means such that said counting means counts pulses generated by said pulse generating means, said counting means including signal generating means for generating a signal to said bi-stable means when a predetermined number of pulses from said pulse generating means is counted by said counting means causing said bi-stable means to generate a signal to said timer means and said second transistor switch means disconnecting said lighting system from said power source; and,
   said counting means being responsive to a signal generated by said bi-stable means for resetting said counting means.

2. A solar recharged power supply circuit as in claim 1 wherein said trigger means comprises:
   photo-detecting means for generating a signal to said bi-stable signal generating means in response to a predetermined amount of ambient light.

3. A solar recharged power supply circuit as in claim 1 wherein said trigger means comprises:
   clock means for generating a signal to said bi-stable signal generating means.

4. A solar recharged power supply circuit as in claim 1 wherein said pulse generating means includes means to vary the number of pulses generated over a time interval.

5. A solar recharged power supply circuit as in claim 1 wherein said first timer means further comprises means for varying the frequency and duration of the pulses generated by said first timer means.

* * * * *